US010252212B2

United States Patent
Byrd

(10) Patent No.: US 10,252,212 B2
(45) Date of Patent: Apr. 9, 2019

(54) MOISTURE RESISTANT MOLECULAR SIEVE BEDS

(71) Applicant: Carleton Life Support Systems Inc., Davenport, IA (US)

(72) Inventor: Gary Byrd, Donahue, IA (US)

(73) Assignee: Carleton Life Support System, Inc., Davenport, IA (US)

(*) Notice: Subject to any disclaimer, the term of this patent is extended or adjusted under 35 U.S.C. 154(b) by 194 days.

(21) Appl. No.: 15/492,725

(22) Filed: Apr. 20, 2017

(65) Prior Publication Data

US 2017/0304767 A1    Oct. 26, 2017

Related U.S. Application Data

(60) Provisional application No. 62/325,172, filed on Apr. 20, 2016.

(51) Int. Cl.
 *B01D 53/04* (2006.01)
 *B64D 13/06* (2006.01)
 *B01D 53/26* (2006.01)

(52) U.S. Cl.
 CPC ..... *B01D 53/0415* (2013.01); *B01D 53/0454* (2013.01); *B64D 13/06* (2013.01);
 (Continued)

(58) Field of Classification Search
 CPC ............ B01D 53/0415; B01D 53/0454; B01D 53/0446; B01D 53/261; B01D 2253/108; B01D 2256/12; B01D 2257/102; B01D 2257/80; B01D 2259/40003; B01D 2259/402; B01D 2259/4575; B64D 13/06; B64D 2013/0677; Y02T 50/44
 (Continued)

(56) References Cited

U.S. PATENT DOCUMENTS 4,031,429 A    3/1977    Sircar et al.
4,203,739 A    5/1980    Erdmannsdorfer
(Continued)

FOREIGN PATENT DOCUMENTS

WO    8704946    8/1987
WO    2006107349    10/2006

OTHER PUBLICATIONS

US 8,562,723 B2, 10/2013, Sprinkle et al. (withdrawn)

*Primary Examiner* — Charles S Bushey
(74) *Attorney, Agent, or Firm* — Woods Oviatt Gilman LLP; Katherine H. McGuire, Esq.

(57) ABSTRACT

An air separation unit for an OBOGS includes a housing having an inlet for receiving a wet inlet air and an outlet for outputting a dry product gas. The housing includes an outer side wall and annular walls defining a series of concentric annular chambers. A first annular chamber is coupled to the inlet and includes a desiccant material to receive the wet inlet air and output a dried air. An unfilled second annular chamber is coupled to the first annular chamber. A third annular chamber is coupled to the second annular chamber at a first end and the outlet at a second end. The third annular chamber receives air separation material to selectively remove unwanted constituents from the dried air and output the dry product gas. A tap may be coupled to the second annular chamber so that dried air may be removed from the housing.

11 Claims, 3 Drawing Sheets

(52) U.S. Cl.
CPC ........ *B01D 53/0446* (2013.01); *B01D 53/261* (2013.01); *B01D 2253/108* (2013.01); *B01D 2256/12* (2013.01); *B01D 2257/102* (2013.01); *B01D 2257/80* (2013.01); *B01D 2259/402* (2013.01); *B01D 2259/40003* (2013.01); *B01D 2259/4575* (2013.01); *B64D 2013/0677* (2013.01); *Y02T 50/44* (2013.01)

(58) Field of Classification Search
USPC .................................................. 96/134, 136
See application file for complete search history.

(56) References Cited

U.S. PATENT DOCUMENTS

| | | | |
|---|---|---|---|
| 4,388,086 A | 6/1983 | Bauer et al. | |
| 4,487,618 A | 12/1984 | Mann | |
| 4,848,989 A | 7/1989 | Maeda | |
| 4,865,815 A | 9/1989 | Martin et al. | |
| 4,897,094 A | 1/1990 | Maeda | |
| 4,946,485 A * | 8/1990 | Larsson | B01D 53/261 96/136 |
| 4,959,083 A | 9/1990 | Garrett | |
| 5,037,454 A | 8/1991 | Mann | |
| 5,061,300 A | 10/1991 | Alexander, III | |
| 5,271,762 A | 12/1993 | Schoofs et al. | |
| 5,288,469 A * | 2/1994 | Skalla | A61B 18/00 261/DIG. 26 |
| 5,593,475 A | 1/1997 | Minh | |
| 5,622,544 A * | 4/1997 | Shamine | B01D 53/261 55/318 |
| 6,059,859 A * | 5/2000 | Alvarez, Jr. | B01D 53/261 95/117 |
| 6,059,863 A | 5/2000 | Monereau et al. | |
| 6,071,321 A * | 6/2000 | Trapp | B01D 45/16 34/80 |
| 6,159,259 A | 12/2000 | Maeda | |
| 6,484,413 B1 | 11/2002 | Larsson | |
| 6,695,896 B2 | 2/2004 | Hara et al. | |
| 6,770,120 B2 | 8/2004 | Neu et al. | |
| 7,144,446 B1 | 12/2006 | Lessi | |
| 7,815,721 B2 | 10/2010 | Wang et al. | |
| 8,388,745 B1 * | 3/2013 | Pelletier | B01D 53/0415 96/108 |
| 8,470,395 B2 | 6/2013 | Khiavi et al. | |
| 9,174,195 B2 | 11/2015 | Yamasaki et al. | |
| 2014/0345464 A1 * | 11/2014 | Behruzi | B01D 53/0407 96/134 |

* cited by examiner

MOISTURE RESISTANT MOLECULAR SIEVE BEDS

FIELD OF THE INVENTION

The present invention generally relates to molecular sieve beds for separating gaseous components within a source gas, and more particularly, to an apparatus and methods for reducing moisture content from the source gas before the gas is separated by the molecular sieve bed, and still more particularly to molecular sieve beds of an On-Board Oxygen Generation System (OBOGS) for separating oxygen from the source gas.

BACKGROUND OF THE INVENTION

On-Board Oxygen Generation Systems (OBOGS) utilizing Pressure Swing Adsorption (PSA) technology have been known in the art to generate breathable, oxygen-enriched product gas. PSA systems generally utilize molecular sieve material, such as zeolite, to separate incoming air from an air source, such as engine bleed air of an aircraft, by adsorbing nitrogen from the bleed air while allowing oxygen to pass therethrough. The separated oxygen may then be ultimately directed to specific areas (e.g., cockpit, cabin) and personnel (e.g., pilot, crew, passengers) aboard the aircraft so as to provide a breathable gas. The adsorbed nitrogen may be periodically purged from the zeolite under reduced pressure by using pressure swing techniques in a known manner. The purged nitrogen is then either dumped overboard or used for other purposes, such as inerting the fuel tank ullage of the aircraft.

To improve system operations and efficiencies, multiple bed systems may be used, such as a dual bed system wherein a first bed is actively separating oxygen from engine bleed air while the second bed is regenerating the zeolite under reduced pressure. A switching valve assembly may dictate which bed is receiving engine bleed air and which bed is regenerating. In this manner, once the air separation efficiency of the first bed is no longer sufficient to produce oxygen enriched output gas having a desired purity of oxygen, the switching valve assembly may direct the pressurized engine bleed air into the regenerated second bed while permitting the corrupted first bed to regenerate its zeolite bed at reduced pressure.

OBOGS efficiency issues can arise when contaminating moisture and water/chemical vapors from the pressurized inlet air enter the molecular sieve bed and interfere with the zeolite active sites and thereby cause the gas separation efficiency of the molecular sieve bed to decrease. By way of example, moisture may damage the crystalline structure of the zeolite. Moreover, this moisture may also be very difficult to desorb from the zeolite bed during the regeneration phase, particularly if the moisture has travelled deep into the center of the bed. As a result, when zeolite particles in a bed are damaged or have adsorbed liquid water, they are much less effective at adsorbing nitrogen such that the air separation efficiency of the molecular sieve bed is compromised.

When nitrogen is not adsorbed by the zeolite and passes through the bed (what may be known in the art as "nitrogen breakthrough"), it will be entrained within the output product gas and act to reduce the oxygen percentage thereof. Nitrogen breakthrough is sometimes desired, such as in the case where a lower oxygen concentration is desired (for instance, depending on altitude). In these instances, a specific concentration of nitrogen may be allowed to pass through the OBOGS so as to produce a product gas possessing the desired percentage of oxygen. However, unintentional and/or uncontrolled nitrogen breakthrough can have disastrous results in that aircraft personnel may not be receiving the desired oxygen percentage and may suffer serious and potentially deadly health effects, such as hypoxia or hypoxemia. Thus, should nitrogen breakthrough be desired, it must be done in a controlled manner in order to maintain the desired oxygen concentration in the separated gas, while also avoiding harmful adverse health effects.

An OBOGS may also use the source air to drive pneumatic valves (directly or through electrically-driven pilot solenoid valves). In multiple bed systems, these valves may be used to selectively cycle source air through the molecular sieve beds as described above. These valves may also assist in the calibration of an on board oxygen sensor. However, moisture in the source air may subject the pneumatic valves and/or solenoid valves to corrosive damage. Moist air may also prevent accurate calibration of the oxygen sensor while also exposing the sensor's internal circuitry to potential corrosive damage.

It may thus be appreciated that it is undesirable to have moisture and water/chemical vapors in the source air. Several proposed solutions have been developed to address this issue. One such proposed solution is to include one or more coalescing filters within the air separation system before the air separation unit so as to reduce any moisture that may enter the zeolite beds. Coalescing filters generally function by causing moisture and vapor particulate (e.g., droplets) to coalesce on a borosilicate glass filter or its equivalent. The particulates aggregate together as condensation on the thin exterior of the glass filter and, when having sufficient density, gravity forces the condensation to trickle into a drain positioned below the filter. Coalescing filters are not, however, usually effective for certain aircraft applications. For instance, cyclic pressure swinging within the aircraft tends to force the particulate to prematurely fall off the glass filter and be subsequently carried into the molecular sieve beds within the flow of inlet air. Coalescing filters are also ineffective in filtering moisture and vapor particulate that have passed over the borosilicate glass filter during the PSA vapor phase, allowing condensation to occur at the molecular sieve inlet and sieve bed. Furthermore, coalescing filters can be rendered temporarily ineffective when placed in an upside down orientation, such as when the corresponding aircraft makes an inverted maneuver.

Another proposed solution is the use of centrifugal separators. Centrifugal separators generally separate contaminating moisture and oil particulate from the bleed air by forcing the airflow to travel centripetally within the separator. Centrifugal forces cause the denser water and/or oil particulates to move to the outer wall of the separator where the particulates will collect and move to a drainage port. While efficient at removing dense contaminants, centrifugal separators are not effective in removing particulates and vapors should these contaminants have insufficient density to be forced to the separator's outer wall prior to being discharged. Rather, these non-separated contaminates remain in the inlet air such that moisture may enter the sieve beds.

Yet another proposed solution is to incorporate a thin desiccant material layer over the molecular sieve bed, an example of which has been disclosed in U.S. Pat. No. 6,681,807 to Byrd (the '807 patent), the entirety of which is incorporate herein. As disclosed within the '807 patent, a layer of desiccant material (e.g., activated alumina) may be deposited on the surface of the zeolite bed wherein the desiccant material adsorbs moisture and vapor particulates from the inlet gas airflow prior to the inlet gas entering the molecular sieve. However, one drawback to this approach is that the molecular sieve is in close contact with the desiccant and may pull moisture from the desiccant when the system is not in operation due to the sieve bed having a higher affinity for moisture than the desiccant. Moreover, the thin desiccant material layer may not allow enough for airflow residence time within the desiccant material so as to enable adsorption of moisture. Increasing the depth of the desiccant layer would increase the airflow residence time but would also cause the desiccant to encroach upon the surrounding molecular sieve components.

A further proposed solution has been to incorporate a vessel of desiccant upstream from a molecular sieve in a radial bed configuration. In this type of system, a mixed bed absorber may include a vessel positioned parallel with an absorbent bed. During operation, a pressurized airflow of wet source air enters into the vessel where the airflow is dried by beds of alumina beads. The dried airflow may then pass through the absorptive material of the air separation (zeolite) bed where contaminating gasses, such as nitrogen and carbon dioxide, are removed before the separated airflow is discharged. While such a system may enable drying of the source gas, this design requires regeneration of the alumina beads through a continuous counter-current flow of heated regeneration gas. This, in turn, causes the source air to intermix with the regeneration gas before the source air makes downstream contact with the radial bed. As a result, separation of additional contaminating gasses not from the airflow of source gas is required, thereby leading to decreased separation efficiencies and decreased separator operational lifetimes. Counter-current flow also creates airflow resistance within the vessel which can cause additional stresses in the absorber. The implementation of heated regeneration gas also results in an undesirable amount of energy usage. Furthermore, the short distance between the vessel and radial absorbent bed does not provide for a physical gap large enough to ensure residual airflow moisture does not make contact with the absorptive material or the radial absorbent bed. Since bed thickness is generally determined by a minimum residence time of the contaminated gas, radial bed absorbers also typically require larger volumes of absorbent material than other molecular sieve configurations. As such, this system may not be suitable for aviation applications where reduced size and weight are critical design parameters.

Another proposed solution to alleviate input airflow moisture has been to cool the incoming air (such as hot engine bleed air) through at least one heat exchanger before the airflow enters the OBOGS unit. According to this method, the moist air is cooled which allows water and/or oil vapors to condense to a liquid that can then be separated from the airflow and drained. However, while some water and water/oil vapor may be removed, the airflow continues to be saturated with unwanted vapors when exited from the heat exchanger. That is, the relative humidity of the air does not change as the cool air merely holds less water vapor than hot air. As a result, water/oil vapors may still be carried into the molecular sieve where they may condense within the sieve bed and cause a reduction in air separation efficiency.

Thus, there remains a need for a system and method which removes moisture from source air, such as source air for use in an OBOGS. There is also a need for providing a moisture-free airflow to the valves used to cycle the molecular sieve beds within the OBOGS. The moisture-free airflow may also assist in oxygen sensor calibration. The present invention satisfies these, as well as other, needs.

SUMMARY OF THE INVENTION

The present invention addresses the above needs by providing an air separation unit for an OBOGS including a housing having an inlet for receiving a wet inlet air and an outlet for outputting a dry product gas. The housing includes an outer side wall and two or more annular walls to thereby define a series of concentric annular chambers within the housing. A first annular chamber is defined by the outer side wall and a first annular wall and is fluidly coupled to the inlet. The first annular chamber includes a desiccant material configured to receive the wet inlet air and output a dried air. An unfilled second annular chamber is defined by the first annular wall and a second annular wall and is fluidly coupled to the first annular chamber via a first passageway. A third annular chamber is defined by the second annular wall and a third annular wall and is fluidly coupled to the second annular chamber via a second passageway at a first end and the outlet at a second end. The third annular chamber is configured to receive air separation material to selectively remove unwanted constituents from the dried air and output the dry product gas.

In a further aspect of the present invention, the air separation unit may further comprise a fourth annular chamber defined by the third annular wall and a central post and fluidly coupled to the third annular chamber via a third passageway at a first end and the outlet at a second end. The fourth annular chamber may be configured to receive air separation material to selectively remove unwanted constituents from the dried air and output the dry product gas. At least a portion of the air separation material in the third annular chamber may be different than at least a portion of the air separation material in the fourth annular chamber.

In another aspect of the present invention, the air separation unit may include a dried air tap fluidly coupled to the second annular chamber whereby a portion of the dried air may be removed from the housing before the dried air enters the third annular chamber. The air separation material may also comprise a zeolite selected to adsorb nitrogen gas and output an oxygen product gas. The desiccant material may comprise a porous or non-porous alumina-based particulate material and the first passageway may comprise an orifice defined within the first annular wall with the orifice having a diameter smaller than a diameter of the desiccant material.

In still a further aspect of the present invention, an air separation system for an OBOGS may comprise first and second air separation units, a switchable valve assembly and a plenum. Each air separation unit may comprise a housing having an inlet for receiving a wet inlet air and an outlet for outputting a dry product gas. The housing includes an outer side wall and two or more annular walls to thereby define a series of concentric annular chambers within the housing. A first annular chamber may be defined by the outer side wall and a first annular wall and may be fluidly coupled to the inlet. The first annular chamber may include a desiccant material configured to receive the wet inlet air and output a dried air. An unfilled second annular chamber may be defined by the first annular wall and a second annular wall and may be fluidly coupled to the first annular chamber via a first passageway. The housing may further include a dried air tap fluidly coupled to the second annular chamber whereby a portion of the dried air may be removed from the housing. A third annular chamber may be defined by the second annular wall and a third annular wall and may be fluidly coupled to the second annular chamber via a second passageway at a first end and the outlet at a second end. The third annular chamber may be configured to receive air separation material to selectively remove unwanted constituents from the dried air and output the dry product gas. The switchable valve assembly may be configured to receive the wet inlet air and selectively deliver the wet inlet air to the first air separation unit when in a first state and the second air separation unit when in a second state. The plenum may be fluidly coupled to the dried air tap of each of the first and second air separation units at a first end and to the switchable valve assembly at a second end. The plenum may be configured to receive a portion of the dried air from the selected first or second air separation unit and selectively cycle the switchable valve assembly between the first state and the second state as a function of a purity of the dry product gas being output from the selected air separation unit receiving the wet inlet air.

In another aspect of the present invention, the air separation system may further include a control unit operably coupled to the plenum whereby the plenum selectively cycles the switchable valve assembly between the first and second states upon receipt of a control signal from the control unit. An output gas sensor may be downstream from the outlet of each of the first and second air separation units and may be configured to measure the purity of the dry gas product. The control unit may send the control signal to the plenum when the measured purity falls below a threshold limit.

Additional objects, advantages and novel aspects of the present invention will be set forth in part in the description which follows, and will in part become apparent to those in the practice of the invention, when considered with the attached figures.

DETAILED DESCRIPTION OF THE PREFERRED EMBODIMENTS

Figure 1:
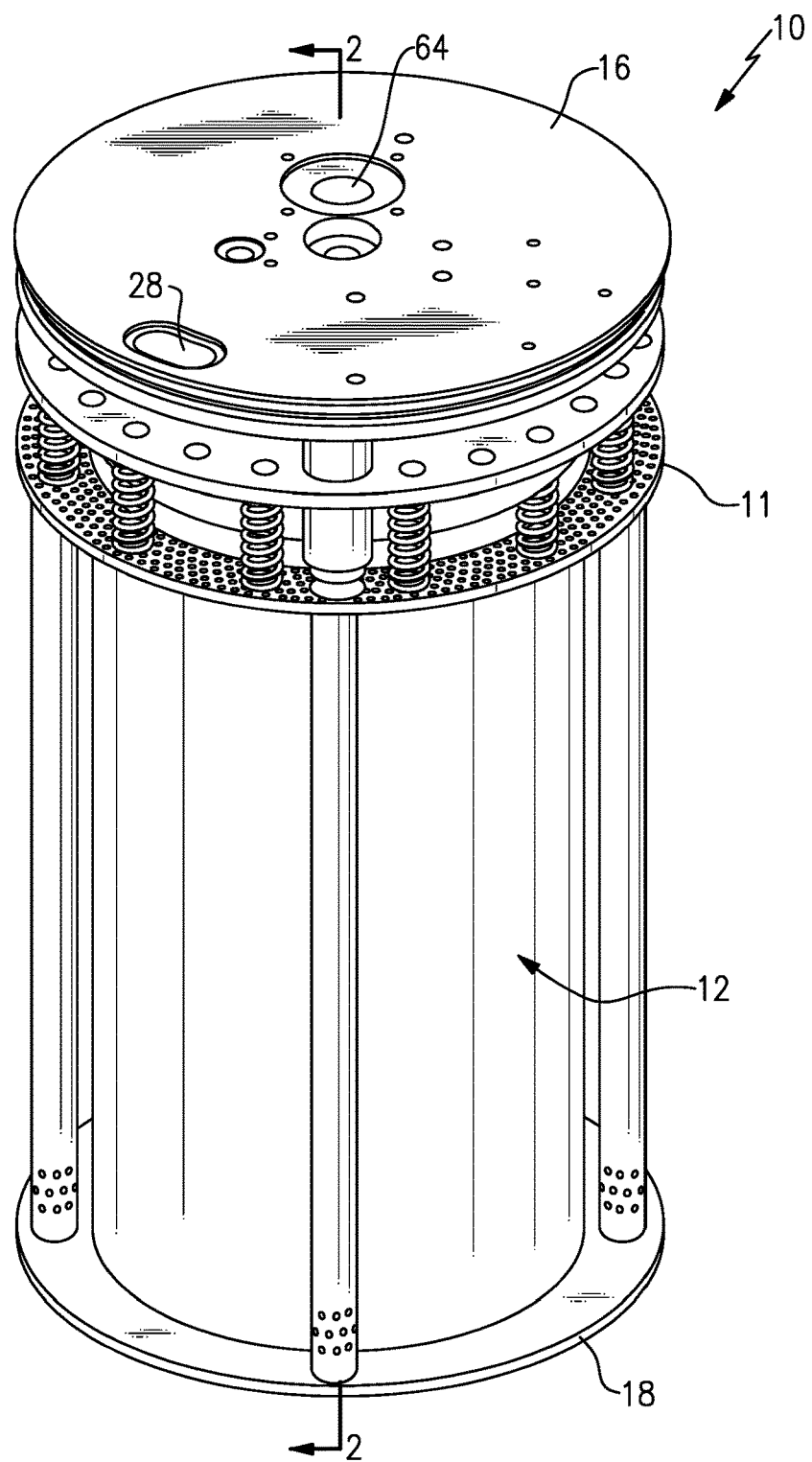
FIG. 1 is a perspective view of an air separation unit in accordance with an aspect of the present invention with the outer wall shown in phantom to reveal internal components thereof.
Figure 2:
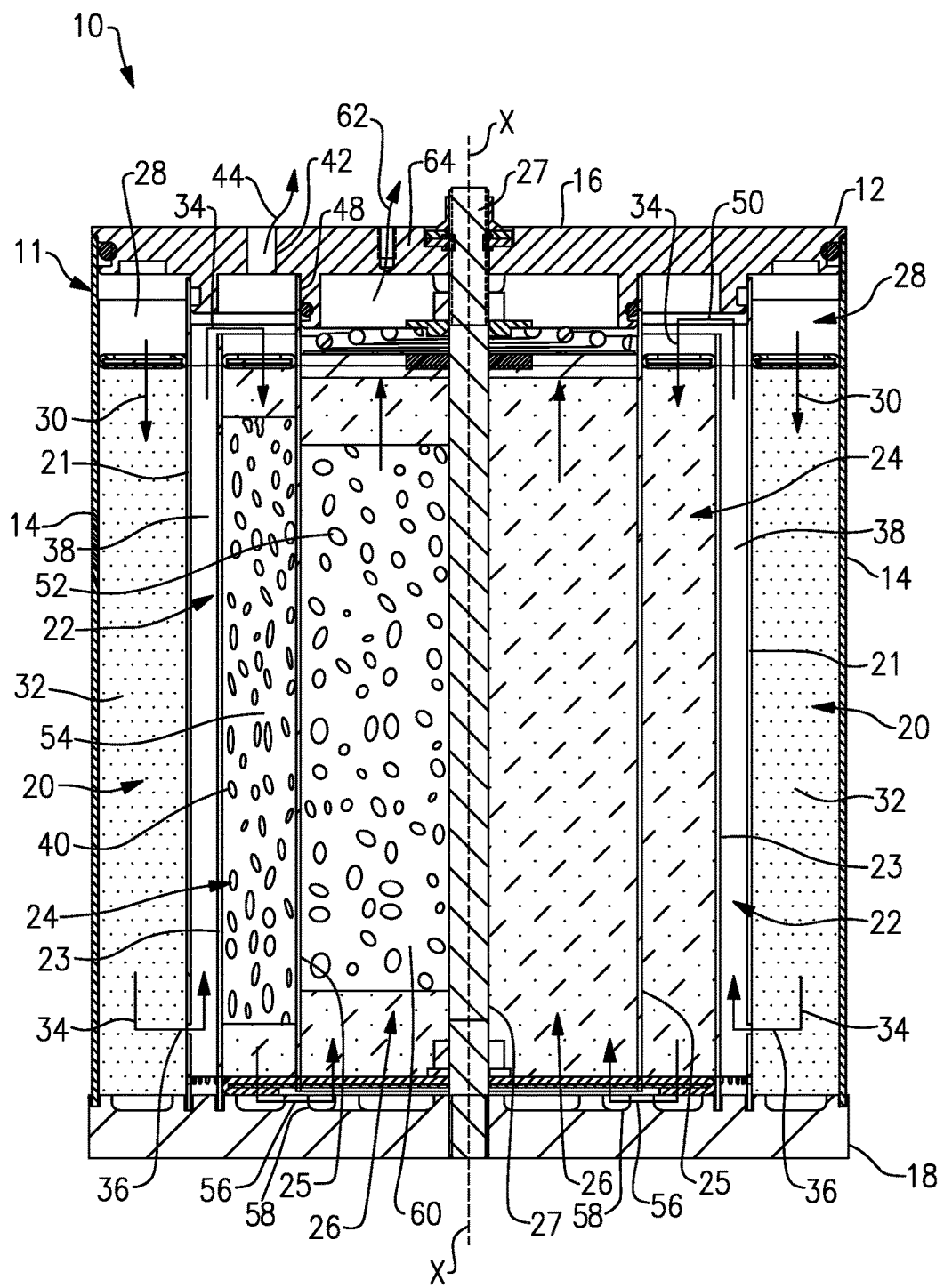
FIG. 2 is a cross-section view of the air separation unit shown in FIG. 1, taken generally along line 2-2.

Referring now to FIGS. 1 and 2 there is seen an on-board oxygen generating (OBOGS) air separation unit 10 in accordance with an aspect the present invention. Air separation unit 10 may be installed within an aircraft (not shown) and may operate to separate individual gaseous components (e.g., oxygen and nitrogen) within inlet air provided by an air source, such as high pressure bleed air exhausted from the aircraft's engine(s) or pressurized air from an air compressor. Air separation unit 10 may separate the inlet air for downstream delivery of breathable air to specific areas (e.g., the cockpit and/or cabin) and/or personnel within the aircraft (e.g., the pilot, passengers and/or crew) having an enriched oxygen concentration which may be approximately 95% oxygen by volume, for example.

Air separation unit 10 generally comprises bed unit 11 including a housing 12 having outer side wall 14, top plate 16 and bottom plate 18. Defined within the confines of housing 12 is a series of concentric annular chambers 20, 22, 24 and 26. A first annular wall 21 defines first annular chamber 20 between outer side wall 14 and first annular wall 21; second annular wall 23 defines second annular chamber 22 between first annular wall 21 and second annular wall 23; third annular wall 25 defines third annular chamber 24 between second annular wall 23 and third annular wall 25; and central post 27 defines fourth annular chamber 26 between third annular 25 and central post 27. It should be noted that FIG. 2 shows a cross section of housing 12 with annular chambers 20, 22, 24 and 26 to the left of the longitudinal axis X-X shown with material content therein while the same annular chambers seen to the right of the longitudinal axis X-X are shown without material content therein for ease of description.

As seen in FIGS. 1 and 2, inlet 28 is configured to direct inlet air 30 from an air source (not shown) to first annular chamber 20. First annular chamber 20 is configured to be filled with desiccant material 32 selected to absorb certain contaminants within inlet air 30, such as but not limited to, liquid water, water vapor or chemical vapors such as from oil or fuel. A non-limiting example of a suitable desiccant material 32 may be porous or non-porous alumina-based particulates or spheres having, for example, diameters between about 5 mm to about 12 mm. Thus, for example, after entering first annular chamber 20 through inlet 28, inlet air 30 may flow through desiccant material 32 whereby liquid water and water/chemical vapors within inlet air 30 are substantially removed from inlet air 30 before dried air 34 is discharged from first annular chamber 20 into second annular chamber 22, such as via first passage 36 defined within first annular wall 21. First passage 36 may be defined by one or more orifices within first annular wall 21, with each orifice proportioned to have a diameter that is smaller than the diameter of desiccant material 32 within first annular chamber 20 so as to prevent the desiccant material from escaping first annular chamber 20 and entering second annular chamber 22. As used herein, "dried air" means air that is substantially moisture free, such as having a relative humidity of less than about 5 percent (5%).

Second annular chamber 22 defines an open (unfilled) passageway 38 configured to provide a gap separating desiccant material 32 within first annular chamber 20 from air separation material 40 (e.g., zeolite) within third annular chamber 24. Housing 12 may include a dried air tap 42 in communication with discharge end 48 of second annular chamber 22 whereby system users (e.g., aircraft crew) may withdraw dried air 44 from housing 12 prior to separating the gaseous constituents of dried air 34 within third annular chamber 24 and fourth annular chamber 26, as will be discussed below. Withdrawn dried air 44 may then be used to calibrate an oxygen sensor 46, as well as to operate system valves that may be include within the system so as to monitor OBOGS performance as will be discussed in greater detail below.

Second passage 50 is located at discharge end 48 of second annular chamber 22 whereby dried air 34 may pass into third annular chamber 24. Third annular chamber 24 is configured to receive molecular sieve material 40 (such as but not limited to, zeolite particulates) so as to form packed sieve bed 54. In accordance with an aspect of the present invention, packed sieve bed 54 is packed with zeolite material which selectively adsorbs nitrogen gas from the airflow of dried air 34 so as to output oxygen enriched air (OEA) 56.

To create a longer flow path and increase nitrogen adsorption within air separation unit 10, third passage 58 may be located and provide fluid communication between third annular chamber 24 and fourth annular chamber 26. Similar to third annular chamber 24 discussed above, fourth annular chamber 26 generally receives molecular sieve material 52 so as to form a packed sieve bed 60. Packed sieve bed 60 may remove remaining nitrogen gas within OEA 56 received from third annular chamber 24 so as to output a substantially pure (e.g., >95%) oxygen product gas 62 through outlet 64. It should be understood by those skilled in the art that fourth annular chamber 26 may be filled with a different molecular sieve material than third annular 24 depending upon inlet gas compositions and desired product gas to be output at outlet 64.

Figure 3:
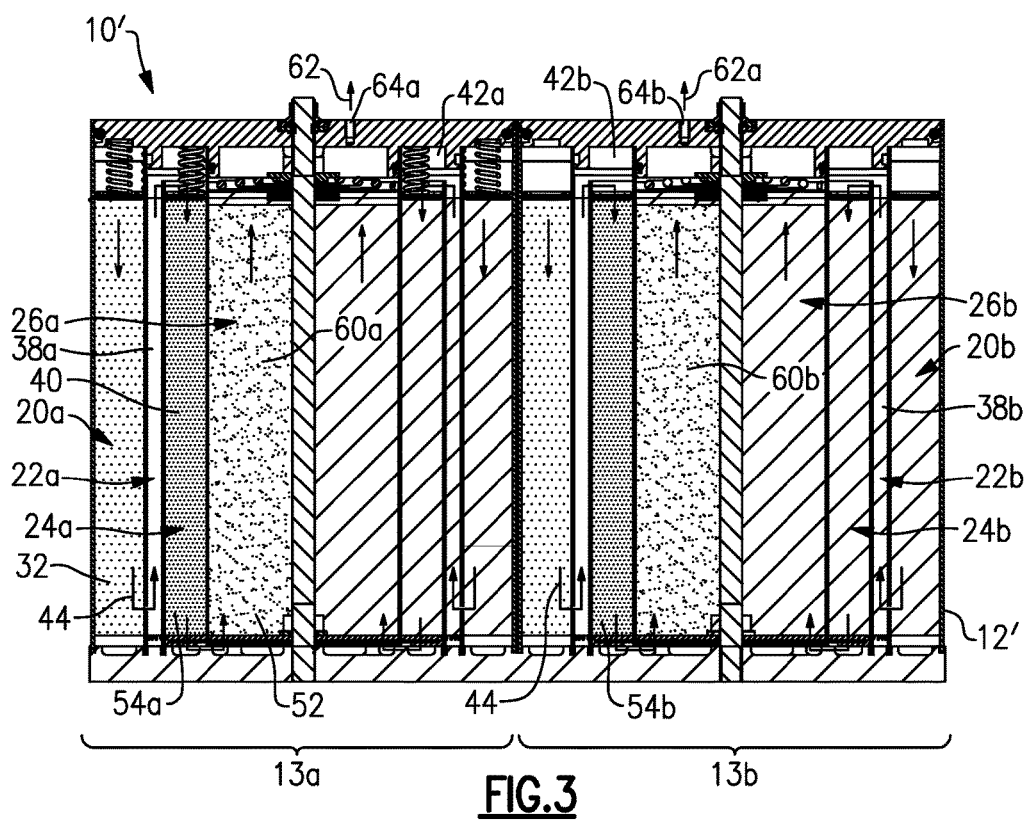
FIG. 3 is a cross section view of an alternative air separation unit in accordance with an aspect of the present invention.
Figure 4:
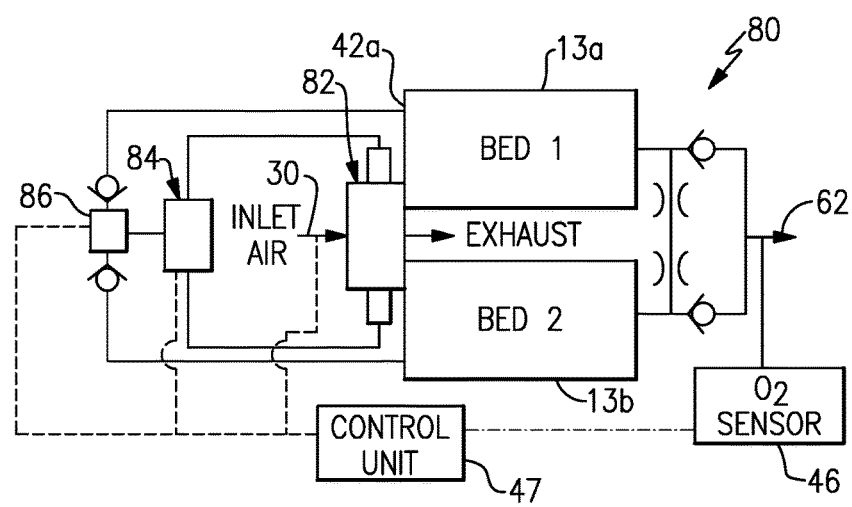
FIG. 4 is a block diagram of an air separation system in accordance with an aspect of the present invention.

Turning now to FIGS. 3 and 4, in accordance with a further embodiment of the present invention, OBOGS air separation unit 10' may generally comprise housing 12' which is configured to include a pair of respective bed units 13a/13b arranged adjacent to one another. Each bed unit 13a, 13b may define respective series of concentric annular chambers 20a/20b, 22a/22b, 24a/24b and 26a/26b similar to housing 12 and associated series of annular chambers 20, 22, 24 and 26 as described above with regard to air separation unit 10. As described above, first annular chambers 20/20b may be substantially filled with desiccant material 32, second annular chambers 22a/22b may define respective open passageways 38a/38b configured to provide a gap between respective first annular chambers 20a/20b and respective third annular chambers 24a/24b. Third annular chambers 24a/24b may receive molecular sieve material 40 so as to form respective packed sieve beds 54a/54b while fourth annular chambers 26a/26b may receive molecular sieve material 52 so as to form respective packed sieve beds 60a/60b. Each bed unit 13a/13b may also include a respective dried air tap 42a/42b to allow withdrawal of non-separated dried air 44 and a respective outlet 64a/64b for delivery of OEA product gas 62 to downstream locations (e.g., the aircraft cockpit or cabin, or select crewmembers (e.g., the pilot)).

FIG. 4 shows a general schematic of OBOGS 80 which may incorporate air separation unit 10' in accordance with another aspect of the present invention. Air separation unit 10' may be coupled to a switchable valve assembly, such as slide valve 82 which may selectively cycle input of inlet air 30 into either bed unit 13a or bed unit 13b. By way of example, bed unit 13a may be charged with inlet air 30 so as to output OEA product gas 62 while bed unit 13b is depressurized so as to desorb nitrogen gas and regenerate sieve beds 54b, 60b, as well as dry desiccant material 32 in preparation for a subsequent separation cycle.

As further shown in FIG. 4 and continuing the above example, non-separated dried air 44 may be directed from dried air tap 42a to plenum 84 through operation of dual check valve assembly 86. The percent oxygen of the output OEA product gas 62 may be monitored, such as by oxygen sensor 46 in communication with a control unit 47 within OBOGS 80 (see FIG. 4). Should the oxygen product gas 62 being produced by bed unit 13a fall below a predetermined percent oxygen threshold, plenum 84 may be triggered by control unit 47 to discharge a pulse of dried air configured to actuate slide valve 82. Actuation of slide valve 83 will redirect inlet air 30 into regenerated bed unit 13b while now-corrupted bed unit 13a may be depressurized so as to desorb nitrogen within sieve beds 54a, 60a and dry desiccant material 32 in first annular chamber 20a. In this manner, one of bed units 13a or 13b may be charged with inlet air 30, so as to selectively adsorb nitrogen gas and output a substantially pure (e.g., >95%) oxygen product gas 62, while the other of bed units 13a or 13b is at reduced pressure, thereby desorbing nitrogen from the zeolite and regenerating zeolite active sites within sieve bed 54(a or b), 60(a or b) and drying desiccant material 32 in first annular chamber 20a/20b. As can be seen, input of inlet air 30 may be cycled between bed units 13a and 13b via slide valve 82 and, as a result, a near constant output of substantially pure oxygen product gas may be achieved. In accordance with an aspect of the present invention, extracting a portion of non-separated dried air 44 to drive slide valve 82 may prolong the operational life of the slide valve when compared to slide valve actuation using wet inlet air as is known in the art.

It should be appreciated by those skilled in the art that, while packed sieve beds 54/54a/54b, 60/60a/60b have been described as selectively adsorbing nitrogen gas so as to produce OEA, air separation unit 10, 10' may include packed sieve beds including molecular sieve material selected to separate gasses other than nitrogen from the airflow. For example, air separation unit 10, 10' may include molecular sieve material selected to adsorb oxygen gas from the airflow so as to produce an output gas of nitrogen enriched air (NEA) for fuel tank inerting and other similar applications. Moreover, while air separation unit 10' is shown and described as a single, integrally-formed unit, a two-bed system may employ two individual air separation units 10 placed in close proximity to one another through appropriate plumbing and control pathways, as is known in the art.

The foregoing description of the preferred embodiment of the invention has been presented for the purpose of illustration and description. It is not intended to be exhaustive nor is it intended to limit the invention to the precise form disclosed. It will be apparent to those skilled in the art that the disclosed embodiments may be modified in light of the above teachings. The embodiments described are chosen to provide an illustration of principles of the invention and its practical application to enable thereby one of ordinary skill in the art to utilize the invention in various embodiments and with various modifications as are suited to the particular use contemplated. Therefore, the foregoing description is to be considered exemplary, rather than limiting, and the true scope of the invention is that described in the following claims.

What is claimed is:

1. An air separation unit for an OBOGS comprising a housing having an inlet for receiving a wet inlet air and an outlet for outputting a dry product gas, the housing including an outer side wall and first, second and third annular walls to thereby define a series of concentric annular chambers within the housing, wherein:
   a. a first annular chamber is defined by the outer side wall and the first annular wall and is fluidly coupled to the inlet, the first annular chamber including a desiccant material configured to receive the wet inlet air and output a dried air;
   b. an unfilled second annular chamber defined by the first annular wall and the second annular wall and fluidly coupled to the first annular chamber via a first passageway; and
   c. a third annular chamber defined by the second annular wall and the third annular wall and fluidly coupled to the second annular chamber via a second passageway at a first end and the outlet at a second end, the third annular chamber configured to receive air separation material to selectively remove unwanted constituents from the dried air and output the dry product gas.

2. The air separation unit bed of claim 1 further comprising a fourth annular chamber defined by the third annular wall and a central post and fluidly coupled to the third annular chamber via a third passageway at a first end and the outlet at a second end, the fourth annular chamber configured to receive air separation material to selectively remove unwanted constituents from the dried air and output the dry product gas.

3. The air separation unit of claim 2 wherein at least a portion of the air separation material in the third annular chamber is different than at least a portion of the air separation material in the fourth annular chamber.

4. The air separation unit of claim 1 wherein the housing further includes a dried air tap fluidly coupled to the second annular chamber whereby a portion of the dried air may be removed from the housing before the dried air enters the third annular chamber.

5. The air separation unit of claim 1 wherein the air separation material comprises a zeolite.

6. The air separation unit of claim 5 wherein the zeolite is selected to adsorb nitrogen gas and output an oxygen product gas.

7. The air separation unit of claim 1 wherein the desiccant material comprises a porous or non-porous alumina-based particulate material.

8. The air separation unit of claim 1 wherein the first passageway comprises an orifice defined within the first annular wall, the orifice having a diameter smaller than a diameter of the desiccant material.

9. An air separation system for an OBOGS comprising:
a. first and second air separation units, each air separation unit comprising:
a housing having an inlet for receiving a wet inlet air and an outlet for outputting a dry product gas, the housing including an outer side wall and first, second and third annular walls to thereby define a series of concentric annular chambers within the housing, wherein:
  i. a first annular chamber is defined by the outer side wall and the first annular wall and is fluidly coupled to the inlet, the first annular chamber including a desiccant material configured to receive the wet inlet air and output a dried air;
  ii. an unfilled second annular chamber defined by the first annular wall and the second annular wall and fluidly coupled to the first annular chamber via a first passageway, the housing including a dried air tap fluidly coupled to the second annular chamber whereby a portion of the dried air may be removed from the housing;
  iii. a third annular chamber defined by the second annular wall and the third annular wall and fluidly coupled to the second annular chamber via a second passageway at a first end and the outlet at a second end, the third annular chamber configured to receive air separation material to selectively remove unwanted constituents from the dried air and output the dry product gas; and
b. a switchable valve assembly configured to receive the wet inlet air and selectively deliver the wet inlet air to the first air separation unit when in a first state and the second air separation unit when in a second state; and
c. a plenum fluidly coupled to the dried air tap of each of the first and second air separation units at a first end and to the switchable valve assembly at a second end, the plenum configured to receive a portion of the dried air from the selected first or second air separation unit and selectively cycle the switchable valve assembly between the first state and the second state as a function of a purity of the dry product gas being output from the selected air separation unit receiving the wet inlet air.

10. The air separation system of claim 9 further comprising:
d. a control unit operably coupled to the plenum whereby the plenum selectively cycles the switchable valve assembly between the first and second states upon receipt of a control signal from the control unit.

11. The air separation system of claim 10 further comprising:
e. an output gas sensor downstream from the outlet of each of the first and second air separation units and configured to measure the purity of the dry gas product, wherein the control unit sends the control signal to the plenum when the measured purity falls below a threshold limit.

* * * * *